UNITED STATES PATENT OFFICE.

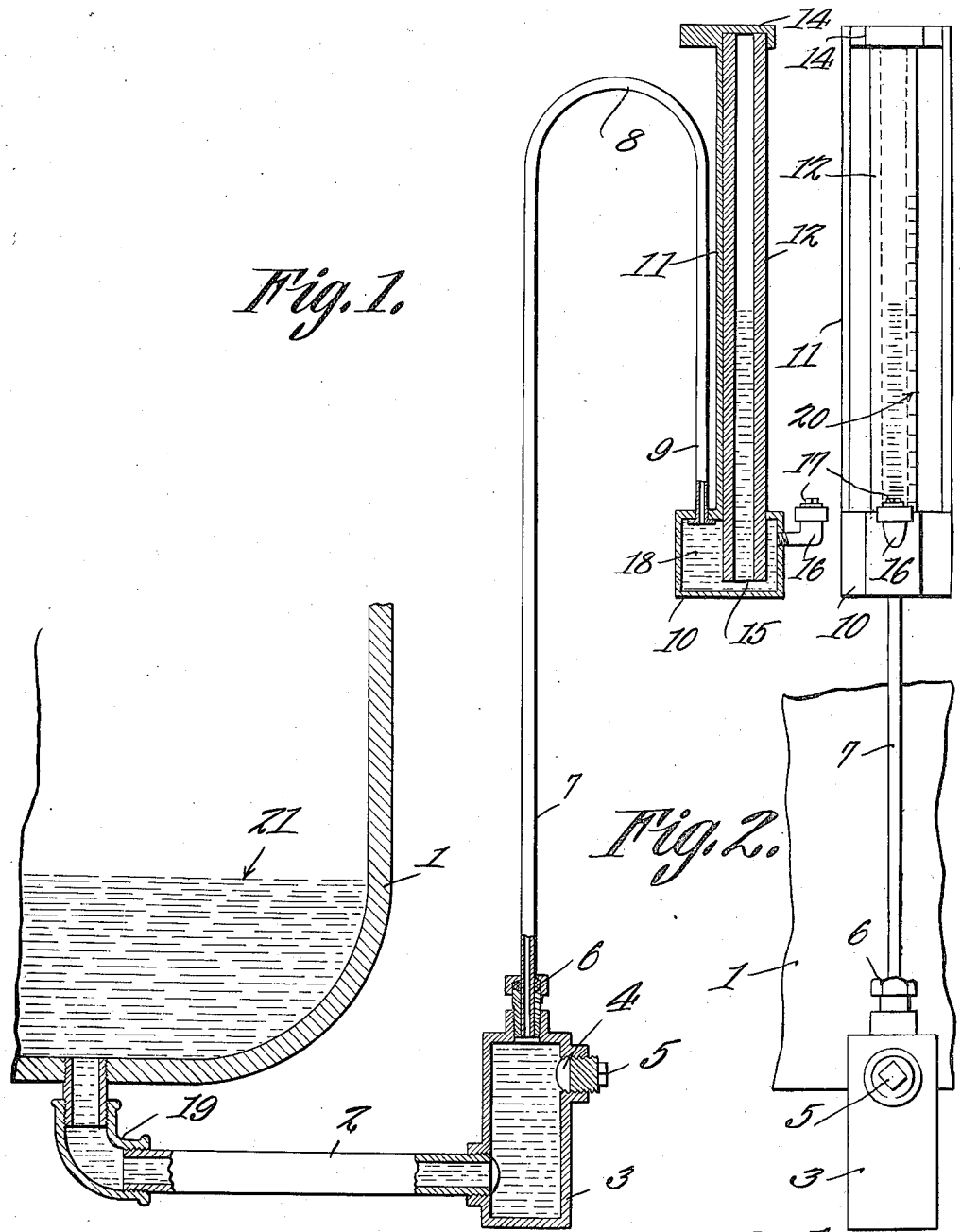

CHARLES ALBERT ROHM, OF SAYVILLE, NEW YORK, ASSIGNOR OF ONE-HALF TO CHARLES AYERS, OF SAYVILLE, NEW YORK.

INDICATOR.

1,195,736.  Specification of Letters Patent.  Patented Aug. 22, 1916.

Application filed March 23, 1915. Serial No. 16,524.

*To all whom it may concern:*

Be it known that I, CHARLES A. ROHM, a citizen of the United States, residing at Sayville, in the county of Suffolk and State of New York, have invented a new and useful Indicator, of which the following is a specification.

The device forming the subject matter of this application is adapted to be employed for indicating the height of a liquid in a tank, the structure being adapted for use primarily, although not exclusively in connection with the gasolene supply systems of internal combustion engines, as used on automobiles and elsewhere.

The invention aims to provide novel means whereby, through air pressure, created in a conduit by the liquid in the tank, an indicator may be operated through the medium of a liquid different from the liquid in the tank and separate therefrom.

The invention aims to provide a means whereby an indicator located at a distance from the tank, may be actuated by air pressure to indicate the level of the contents of the tank.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 is a vertical sectional view in which certain parts appear in elevation; Fig. 2 is an elevation wherein the structure is viewed at right angles to the showing of Fig. 1.

In carrying out the present invention there is provided a tank 1 of any desired sort, the tank in some instances being represented by the crank case of an engine. Communicating with the bottom of the tank 1 is an air conduit constituting a trap for the contents of the tank. The air conduit is a composite structure and embodies a pipe 2 opening into the bottom of the tank 1 through the medium of a coupling of any suitable sort indicated at 19. The pipe 2 communicates with an upright receptacle 3 near the bottom of said receptacle, the receptacle 3 being provided near its top with an opening 4 controlled by a removable closure which may be a plug 5. The opening 4 is alined with or located slightly below the bottom of the tank 1, so that the tank may be drained completely when the closure plug 5 is removed. The upper end of the receptacle 3 carries a packing gland 6 holding one end of a pipe 7 curved intermediate its ends as shown at 8 to define a depending end 9 communicating with a closed container 10 supported on a suitable frame 11. Communicating with the container 10 is a gage tube 12, the upper end of which is closed as indicated at 14 by a portion of the frame 11 or in any other suitable manner. The lower end 15 of the gage tube 12 opens into the container 10, the gage tube being suitably graduated as indicated at 20 for the purpose of indicating the height of the liquid 21 in the tank 1. The container 10 may be provided with a lateral nipple 16 controlled by a removable closure 17, the construction being such that a liquid 18 may be introduced readily into the container 10.

In practical operation, the coupling 19, the pipe 2 and the receptacle 3 act as a trap, retaining the contents 21 of the tank 1 and preventing air from flowing from the tank 1 to the pipe 7. The pipe 7, however, retains a quantity of air between the level of liquid in the receptacle 3 and the level of the liquid received in the container 10. The air thus carried in the pipe 7 is put under pressure by the hydrostatic action of the liquid 21 in the tank 1 and this pressure is transmitted to the liquid 18 in the container 10, the liquid 18 thus being caused to rise in the gage 12 and to indicate on the graduations 20, the height of the liquid 21 in the tank 1.

The graduations 20 may constitute a part of an empirical scale, but, preferably, the specific gravity of the liquid 18 in the container 10 is adjusted until the reading from the gage glass scale 20 corresponds correctly with the measured depth of the liquid 21 in the tank 1.

Having thus described the invention, what is claimed is:—

In a device of the class described, a tank; a conduit leading from the bottom of the tank; a receptacle wherewith the conduit communicates, the receptacle having a side opening located on an approximate level with the bottom of the tank and constituting a means whereby the tank may be drained completely; a container located above the receptacle; a graduated tube communicating with the receptacle; an air pipe extended between the receptacle and the container; the container having a side opening adapted to receive liquid whereby the specific gravity of the contents of the tube and the container may be changed, the lower end of the graduated tube extending downwardly into the container to a point opposite to the opening, thereby to act as a deflector for liquid introduced into the container through said opening and to effect a distribution of the said liquid within the container; and a removable closure for the side opening in the container.

In testimony that I claim the foregoing as my own, I have hereto affixed my signature in the presence of two witnesses.

CHARLES ALBERT ROHM.

Witnesses:
ALFRED C. EDWARDS,
HANNAH B. EDWARDS.